(12) United States Patent
Isler et al.

(10) Patent No.: US 12,438,744 B2
(45) Date of Patent: Oct. 7, 2025

(54) EXTENDING BACNET SYSTEMS TO SCALE UP TO LARGE TOPOLOGIES

(71) Applicant: Siemens Schweiz AG, Zürich (CH)

(72) Inventors: Bernhard Isler, Wilen b. Wollerau (CH); Kai Rohrbacher, Hünenberg (CH)

(73) Assignee: SIEMENS SCHWEIZ AG, Zurich (CH)

( * ) Notice: Subject to any disclaimer, the term of this patent is extended or adjusted under 35 U.S.C. 154(b) by 203 days.

(21) Appl. No.: 18/550,350

(22) PCT Filed: Mar. 31, 2022

(86) PCT No.: PCT/EP2022/058542
§ 371 (c)(1),
(2) Date: Sep. 13, 2023

(87) PCT Pub. No.: WO2022/214383
PCT Pub. Date: Oct. 13, 2022

(65) Prior Publication Data
US 2024/0154840 A1      May 9, 2024

(30) Foreign Application Priority Data

Apr. 8, 2021    (EP) ..................... 21167436

(51) Int. Cl.
*H04L 12/28*        (2006.01)
*H04L 67/02*        (2022.01)
(52) U.S. Cl.
CPC ............ *H04L 12/283* (2013.01); *H04L 67/02* (2013.01)

(58) Field of Classification Search
None
See application file for complete search history.

(56) References Cited

U.S. PATENT DOCUMENTS 6,487,457 B1 * 11/2002 Hull ..................... G05B 19/042
                                                            700/86
9,853,827 B1 * 12/2017 Goodnow ............. H04L 12/281
(Continued)

FOREIGN PATENT DOCUMENTS

EP        3 334 097        6/2018  ............. H04L 12/46

OTHER PUBLICATIONS

Search Report for International Application No. PCT/EP2022/058542, 11 pages, Jul. 22, 2022.
(Continued)

*Primary Examiner* — Quang N Nguyen
(74) *Attorney, Agent, or Firm* — Slayden Grubert Beard PLLC (57) ABSTRACT

Various teachings include methods and/or BACnet network systems to extend BACnet network systems for building automation systems to scale up to large topologies. The BACnet network system comprises a network of BACnet devices organized as a virtual hub-and-spoke network. One of the BACnet devices is implemented as a directed hub-device to which all other BACnet devices are connected as node-devices by using WebSocket connections. The directed hub-device is configured to limit the broadcast distribution of broadcast messages from a downlink-connection to each uplink-connection, and not to any other downlink-connection. The directed hub-device is configured to block or forward unicast messages from one downlink-connection to another downlink-connection.

22 Claims, 6 Drawing Sheets

(56) References Cited

U.S. PATENT DOCUMENTS

| | | | |
|---|---|---|---|
| 2015/0180920 A1 | 6/2015 | Hunter | H04L 65/4061 |
| 2018/0167229 A1* | 6/2018 | Brun | G06F 11/3048 |
| 2019/0094827 A1 | 3/2019 | Park | G05B 19/042 |

OTHER PUBLICATIONS

Stamatescu, Grigore et al: "Cybersecurity Perspectives for Smart Building Automation Systems"; 2020 12th International Conference on Electronics, Computers and Artificial Intelligence (ECAI), IEEE; pp. 1-5, Jun. 25, 2020.

\* cited by examiner

EXTENDING BACNET SYSTEMS TO SCALE UP TO LARGE TOPOLOGIES

CROSS-REFERENCE TO RELATED APPLICATIONS

This application is a U.S. National Stage Application of International Application No. PCT/EP2022/058542 filed Mar. 31, 2022, which designates the United States of America, and claims priority to EP Application No. 21167436.1 filed Apr. 8, 2021, the contents of which are hereby incorporated by reference in their entirety.

TECHNICAL FIELD

The present disclosure relates generally to building management systems or building automation systems comprising a plurality of building devices, e.g. BACnet devices. Various embodiments of the teachings of the present disclosure include systems and/or methods to extend BACnet network systems for building automation systems to scale up to large topologies.

BACKGROUND

A building automation system is an arrangement for monitoring, open-loop control, and/or closed-loop control of process variables in complex technical systems in a building, or in a campus comprising a number of buildings. A building automation system typically operates heating, ventilation and air-conditioning systems, lighting and shading devices and also access control, security and fire surveillance systems. In the building automation system, process variables—such as room air conditioning variables or events, for example—are detected, evaluated, monitored, influenced or generated, with the energy consumption of the building or campus also advantageously being optimized by the building automation system.

Generally, a building automation system encompasses and operates a plurality of field devices, e.g. implemented as BACnet devices, such as sensors and actuators. Examples of typical field devices are temperature and humidity sensors, air quality sensors, pressure sensors, flow meters, electricity meters, heat meters, brightness sensors, fire alarms, intrusion alarms, alarm or sprinkler devices, drives for hot water valves, thermostat valves, ventilation flaps or blinds, light switches, smart card readers or devices for detecting biometric data. The building automation system typically comprises a plurality of software modules, processes or programs, and in general, a number of computers or processors for their activation and also as a rule a plurality of open-loop and closed-loop control devices as well as further devices, for example devices for linking the building automation system to external communication networks and graphical user interfaces having screens for viewing and analysis of captured signals, video and data from monitored and/or controlled points or elements within the building automation system.

BACnet is a communications protocol for building automation and control networks. It is an ASHRAE, ANSI, and ISO 16484-5 standard protocol. BACnet allows communication of building automation and control systems for applications such as heating, ventilating, and air-conditioning control (HVAC), fire and security systems, energy management, lighting control, physical access control, and elevator monitoring systems including their associated equipment. The BACnet protocol provides mechanisms for computerized building automation devices to exchange information, regardless of the particular building service they perform (see Definition in Wikipedia).

A BACnet device implements the BACnet protocol through which the device can communicate. For connection to the network, a BACnet device implements at least one of the datalink and physical layer options defined for BACnet, with BACnet over IP being the dominant standard option today. The information accessible through this protocol is formatted as BACnet objects. The set of standard and proprietary BACnet objects in a BACnet device represents the functionality of that device. BACnet devices may be sensors, actuators, controllers, and also workstations.

A BACnet network is set of BACnet devices that interconnect to each other using one of the datalink and physical layer options defined for BACnet. All connected BACnet devices of a BACnet network can communicate to each other in a peer-to-peer fashion. Multiple BACnet networks maybe interconnected using BACnet Routers, allowing BACnet devices to communicate with other BACnet devices on other BACnet networks that may use a different datalink and physical layer option even.

BACnet is the world's most used communication protocol in commercial building systems. It has a long track record for more than 25 years, meanwhile being used in ~70% of all commercial building automation & control systems globally. However, due to its age, it so far did not specify an accepted method to protect the data traffic between devices. In November 2019, the standard was extended by a method to add authentication and encryption mechanisms to BACnet communication, called "BACnet Secure Connect" (or "BACnet/SC" in short). While this extension solves the basic problem how to cybersecure the datalink level in BACnet systems in an IT-friendly- and application-compatible way, it turns out that this method does not scale up well to support larger sites with 100s or even 1000s of devices. As cybersecurity is an ever more essential requirement in a building's communication, it is obvious that both newly constructed sites and the large existing base of sites direly require a way how their BACnet communication can be done in a secure manner that scales, but still allows for interoperability with standard and other vendor's BACnet/SC equipment.

The standard itself suggests to break up larger building systems into several BACnet/SC networks with each having a hub with their respective set of assigned nodes (BACnet devices), and then to interconnect these BACnet/SC networks mutually by means of the standard BACnet router mechanism. This principle however has size limitations due to the amount of total traffic (especially global broadcast traffic) that can overload the resources of single nodes, the hub, BACnet routers, but also the entire underlying IP-networks, too.

Furthermore, in BACnet over IP (BACnet/IP) networks, the broadcast communication in large BACnet/IP systems is usually limited to interested parties by using asymmetric BACnet Broadcast Management Device (BBMD) configurations, as a common industry practice.

SUMMARY

The teachings of the present disclosure include mechanisms for BACnet network systems to be easily scaled up to large topologies. As an example, some embodiments include a method to extend BACnet network systems for building automation systems to scale up to large topologies, wherein the BACnet network system comprises a network of BACnet devices (300-304, 311, 312), wherein the network of BACnet devices (300-304, 311, 312) is organized as a virtual hub-and-spoke network, wherein one of the BACnet devices (300-304, 311, 312) is implemented as a directed hub-device (300) to which all other BACnet devices are connected as node-devices (301-304, 311, 312) by using WebSocket connections, the method including (ST1) providing node-devices (311) which have a system scope of a building to view and modify the entire building automation system; (ST2) providing node-devices (312) which have a building scope of a building to realize central functions for the entire building automation system or do the supervisory demand control of floors and supply by primary plants; (ST3) wherein the node-devices (311) of the system scope and/or the node-devices (312) of the building scope are assigned to supervisory scope BACnet devices (311, 312); (ST4) providing node-devices (301-303) which provide a floor scope of a building to realize room control functions and/or floor level control functions; (ST5) providing node-devices (304) which provide a plant scope of a building to realize the central supply and equipment control of primary plants and supply; (ST6) wherein the node-devices (301-303) with floor scope and/or the node-devices (304) of the plant scope are assigned to directed scope BACnet devices (301-304); (ST7) wherein the directed hub-device (300) is hosting two WebSocket listeners, (ST8) wherein the first WebSocket listener is accepting uplink-connections (321) for supervisory scope node-devices (311, 312), wherein broadcast distribution of messages from an uplink-connection (321) among all uplink-connections (321) and all downlink-connections (322) is performed according to the BACnet/SC standard; (ST9) wherein the second WebSocket listener is accepting downlink-connections (322) from directed scope node-devices (301-304); (ST10) wherein the directed hub-device (300) limits the broadcast distribution of broadcast messages from a downlink-connection (322) to each uplink-connection (321), and not to any other downlink-connection (322), and (ST11) wherein the directed hub-device (300) is forwarding or blocking unicast messages from one downlink-connection (322) to another downlink-connection (322).

As another example, some embodiments include a method to perform communication in BACnet network systems for building automation systems, wherein the BACnet network system comprises a network of BACnet devices (300-304, 311, 312), wherein the network of BACnet devices (300-304, 311, 312) is organized as a virtual hub- and spoke-network, wherein one of the BACnet devices (300-304, 311, 312) is implemented as a directed hub-device (300) to which all other BACnet devices are connected as node-devices (301-304, 311, 312) by using WebSocket connections, (ST1') providing node-devices (311) which have a system scope of a building to view and modify the entire building automation system; (ST2') providing node-devices (312) which have a building scope of a building to realize central functions for the entire building automation system or do the supervisory demand control of floors and supply by primary plants; (ST3') wherein the node-devices (311) of the system scope and/or the node-devices (312) of the building scope are assigned to supervisory scope node-devices (311, 312); (ST4') providing node devices (301-303) which have a floor scope of a building to realize room control functions and/or floor level control functions; (ST5') providing node-devices (304) which have a plant scope of a building to realize the central supply and equipment control of primary plants and supply; (ST6') wherein the node-devices (301-303) with floor scope and/or the node-devices (304) of the plant scope are assigned to directed scope node-devices (301-304); (ST7') wherein the directed hub-device (300) is hosting two WebSocket listeners, (ST8') wherein the first WebSocket listener is accepting uplink-connections (321) for supervisory scope node-devices (311, 312), wherein broadcast distribution of messages from an uplink-connection (321) among all uplink-connections (321) and all downlink-connections (322) is performed according to the BACnet/SC standard; (ST9') wherein the second WebSocket listener is accepting downlink-connections (322) from directed scope node-devices (301-304); (ST10') wherein the directed hub-device (300) limits the broadcast distribution of broadcast messages from a downlink-connection (322) to each uplink-connection (321), and not to any other downlink-connection (322); and (ST11') wherein the directed hub-device (300) is forwarding or blocking unicast messages from one downlink-connection (322) to another downlink-connection (322).

In some embodiments, the BACnet network system is a BACnet/SC (BACnet Secure Connect) based system.

In some embodiments, at least one of the WebSocket connections is a TLS V1.3-secured WebSocket connection.

In some embodiments, the first WebSocket listener is the regular WebSocket listener.

In some embodiments, the node-devices (301-303) which have a floor scope of a building are configured for respective group communication to coordinate and/or operate actors and/or sensors (e.g. lights and blinds) on the floor.

In some embodiments, the node-devices (304) which have the plant scope of a building are configured to realize the central supply and equipment control of primary plants and supply (like boilers, chillers, air-handling-units, etc.

In some embodiments, the functionality of the two WebSocket listeners hosted in the directed hub-device (300) is realized by the regular WebSocket listener according the BACnet/SC-standard and wherein the node-devices (301-304, 311, 321) are configured to realize the broadcast scope and to indicate to the hub whether an uplink-connection or a downlink-connection rule shall be performed to a respective message.

As another example, some embodiments include a BACnet network system for building automation systems to scale up to large topologies, wherein the BACnet network system comprises a network of BACnet devices (300-304, 311, 312), wherein the network of BACnet devices (300-304, 311, 312) is organized as a virtual hub-and-spoke network, wherein one of the BACnet devices (300-304, 311, 312) is implemented as a directed hub-device (300) to which all other BACnet devices are connected as node-devices (301-304, 311, 312) by using WebSocket connections, providing node devices (311) which have a system scope of a building to view and modify the entire building automation system; providing node devices (312) which have a building scope of a building to realize central functions for the entire building automation system or do the supervisory demand control of floors and supply by primary plants; wherein the node devices (311) of the system scope and the node-devices (312) of the building scope are assigned to supervisory scope node-devices (311, 312); providing node-devices (301-303) which have a floor scope of a building to realize room control functions and/or floor level control functions; providing node-devices (304) which provide a plant scope of a building to realize the central supply and equipment control of primary plants and supply; wherein the node-devices (301-303) of the floor scope and/or the node-devices (304) of the plant scope are assigned to directed scope node-devices (301-304); characterized in that the directed hub-device (300) is hosting two WebSocket listeners, wherein the first WebSocket listener is configured to accept uplink-connections (321) for supervisory scope node-devices (311, 312), wherein broadcast distribution of messages from an uplink-connection (321) among all uplink-connections (321) and all downlink-connections (322) is performed according to the BACnet/SC standard; wherein the second WebSocket listener is configured to accept downlink-connections (322) from directed scope node-devices (301-304); wherein the directed hub-device (300) is configured to limit the broadcast distribution of broadcast messages from a downlink-connection (322) to each uplink-connection (321), and not to any other downlink-connection (322); and wherein the directed hub-device (300) is configured to block or forward unicast messages from one downlink-connection (322) to another downlink-connection (322).

In some embodiments, the BACnet network system is a BACnet/SC (BACnet Secure Connect) based system.

In some embodiments, at least one of the WebSocket connections is a TLS V1.3-secured WebSocket connection.

In some embodiments, the first WebSocket listener is the regular WebSocket listener.

In some embodiments, the node-devices (301-303) which provide the floor scope of a building are configured for respective group on the floor.

In some embodiments, the node-devices (304) which provide the plant scope of a building are configured to realize the central supply and equipment control of primary plants and supply.

In some embodiments, the functionality of the two WebSocket listeners hosted in the directed hub-device (300) is realized by the regular WebSocket listener according the BACnet/SC-standard and wherein the node-devices are configured to realize the broadcast logic and to indicate to the hub whether an uplink-connection or a downlink-connection shall be established with a respective non-standard connection request message.

In some embodiments, the system is configured to perform communication in the BACnet network system.

BRIEF DESCRIPTION OF THE DRAWINGS

The above-mentioned and other embodiments of the teachings of the present disclosure are addressed below with reference to the drawings of example embodiments. The shown embodiments are intended to illustrate, but not to limit the scope of the disclosure. The drawings contain the following figures, in which like numbers refer to like parts throughout the description and drawings and wherein.

DETAILED DESCRIPTION

Some embodiments of the teachings herein include a method to extend BACnet network systems for building automation systems to scale up to large topologies, wherein the BACnet network system comprises a network of BACnet devices, wherein the network of BACnet devices is organized as a virtual hub-and-spoke network, wherein one of the BACnet devices is implemented as a directed hub-device to which all other BACnet devices are connected as node-devices by using WebSocket connections, providing node-devices which have a system scope of a building to view and modify the entire building automation system; providing node-devices which have a building scope of a building to realize central functions for the entire building automation system or do the supervisory demand control of floors and supply by primary plants; wherein the node-devices of the system scope and/or the node-devices of the building scope are assigned to supervisory scope BACnet devices; providing node-devices which provide a floor scope of a building to realize room control functions and/or floor level control functions; providing node-devices which provide a plant scope of a building to realize the central supply and equipment control of primary plants and supply; wherein the node-devices with floor scope and/or the node-devices of the plant scope are assigned to directed scope BACnet devices; wherein the directed hub-device is hosting two WebSocket listeners, wherein the first WebSocket listener is configured to accept uplink-connections for supervisory scope node-devices, wherein broadcast distribution of messages from an uplink-connection among all uplink-connections and all downlink-connections is performed according to the BACnet/SC standard; wherein the second WebSocket listener is configured to accept downlink-connections from directed scope node-devices; wherein the directed hub-device limits the broadcast distribution of broadcast messages from a downlink-connection to each uplink-connection, and not to any other downlink-connection, wherein the directed hub-device can be configured to forward or block unicast messages from one downlink-connection to another downlink-connection.

As another example, some embodiments include a method to perform communication in BACnet network systems for building automation systems, wherein the BACnet network system comprises a network of BACnet devices, wherein the network of BACnet devices is organized as a virtual hub- and spoke-network, wherein one of the BACnet devices is implemented as a directed hub-device to which all other BACnet devices are connected as node-devices by using WebSocket connections, providing node-devices which have a system scope of a building to view and modify the entire building automation system; providing node-devices which have a building scope of a building to realize central functions for the entire building automation system or do the supervisory demand control of floors and supply by primary plants; wherein the node-devices of the system scope and/or the node-devices of the building scope are assigned to supervisory scope node-devices; providing node devices which have a floor scope of a building to realize room control functions and/or floor level control functions; providing node-devices which have a plant scope of a building to realize the central supply and equipment control of primary plants and supply; wherein the node-devices with floor scope and/or the node-devices of the plant scope are assigned to directed scope node-devices; wherein the directed hub-device is hosting two WebSocket listeners, wherein the first WebSocket listener is configured to accept uplink-connections for supervisory scope node-devices, wherein broadcast distribution of messages from an uplink-connection among all uplink-connections and all downlink-connections is performed according to the BACnet/SC standard; wherein the second WebSocket listener is configured to accept downlink-connections from directed scope node-devices; wherein the directed hub-device limits the broadcast distribution of broadcast messages from a downlink-connection to each uplink-connection, and not to any other downlink-connection, wherein the directed hub-device is configured to forward or block unicast messages from one downlink-connection to another downlink-connection.

As another example, some embodiments include a BACnet network system for building automation systems to scale up to large topologies, wherein the BACnet network system comprises a network of BACnet devices, wherein the network of BACnet devices is organized as a virtual hub-and-spoke network, wherein one of the BACnet devices is implemented as a directed hub-device to which all other BACnet devices are connected as node-devices by using WebSocket connections, providing node devices which have a system scope of a building to view and modify the entire building automation system; providing node devices which have a building scope of a building to realize central functions for the entire building automation system or do the supervisory demand control of floors and supply by primary plants; wherein the node devices of the system scope and the node-devices of the building scope are assigned to supervisory scope node-devices; providing node-devices which have a floor scope of a building to realize room control functions and/or floor level control functions; providing node-devices which provide a plant scope of a building to realize the central supply and equipment control of primary plants and supply; wherein the node-devices of the floor scope and/or the node-devices of the plant scope are assigned to directed scope node-devices; wherein the directed hub-device is hosting two WebSocket listeners, wherein the first WebSocket listener is configured to accept uplink-connections for supervisory scope node-devices, wherein broadcast distribution of messages from an uplink-connection among all uplink-connections and all downlink-connections is performed according to the BACnet/SC standard; wherein the second WebSocket listener is configured to accept downlink-connections from directed scope node-devices; wherein the directed hub-device is configured to limit the broadcast distribution of broadcast messages from a downlink-connection to each uplink-connection, and not to any other downlink-connection, wherein the directed hub-device is configured to block or forward unicast messages from one downlink-connection to another downlink-connection.

The BACnet/SC network uses the logical structure of a star topology. That is—independent of the actual cabling topology—, the devices use a central device called "hub" with which they maintain established a WebSocket based connection. The devices that connect to this central "hub" are called (spoke-)"nodes". Any pair of "node" devices that want to do an end-to-end-communication query their "hub" for their respective counterpart. And all datagrams end-to-end are then also routed through that central hub.

Today building automation objects or field devices of a building automation system are widely dispersed throughout a facility or even in different facilities. For example, an HVAC system includes temperature sensors and ventilation damper controls as well as other elements that are located in virtually every area of a facility. Similarly, a security system may have intrusion detection, motion sensors and alarm actuators dispersed throughout an entire building or campus.

Likewise, fire safety systems include smoke alarms and pull stations dispersed throughout the facility. To achieve efficient and effective building automation system operation, there is a need to monitor the operation of, and often communicate with, the various dispersed building automation objects or field devices of a building automation system.

Electrical or wireless communication media are used in a building automation system for the exchange of data of individual devices or parts of systems, as a rule a number of communication networks exist, with cables, optical data communication channels, ultrasound connections, electro-magnetic near field or radio networks able to be used, including fiber optic networks or cellular networks for example. Examples of technologies or standards able to be used for the said data exchange are BACnet, LON from the company ECHELON, KNX, ZigBee or PROFIBUS defined by German standard DIN 19245. BACnet refers to the ANSI/ASHRAE 135-2016 building communication protocol standard, titled "BACnet, A Data Communication Protocol for Building Automation and Control Networks" (2016).

Building automation systems typically have one or more control stations in which data from each of the dispersed building automation objects or field devices in the system may be monitored and in which various aspects of system operation may be controlled and/or monitored. The control station typically includes a computer having processing equipment, data storage equipment, and sometimes a user interface. To allow for monitoring and control of the dispersed building automation objects or field devices, building automation systems often employ multi-level communication networks to communicate operational and/or alarm information between operating elements, such as sensors and actuators, and the control stations.

One example of a building automation system control station is the APOGEE® INSIGHT® Workstation, available from Siemens Industry, Inc. of Buffalo Grove, Ill., which may be used with the model APOGEE® building automation system, also available from Siemens Industry, Inc. (APOGEE and INSIGHT are U.S federally registered trademarks of Siemens Industry, Inc.) In this system, several control stations, connected via an Ethernet or other type of network, may be distributed throughout one or more building locations, each having the ability to monitor and control system operation. As a consequence, different people in different locations of the facility may monitor and control building operations.

A basic principle of the BACnet protocol as such from its very beginning till today is that it relies upon a broadcast mechanism to find the communication partners for devices. The problem with the scalability of any broadcast mechanism is that the amount of traffic potentially generated grows rapidly in the total number of devices that do such broadcasts, which can easily overload single network elements or even the whole data network in total. BACnet's broadcast mechanism shares the same problem. As the required backward compatibility with the huge installed base of BACnet systems does not allow to change those fundamental working principles of the standard, its BACnet/SC extension uses a slightly more sophisticated version of it: In former versions of the communication with BACnet/IP, the devices directly sent their broadcast messages as UDP-broadcast datagrams to the IP network—and it was up to the underlying LAN infrastructure to cope with that traffic.

Figure 1:
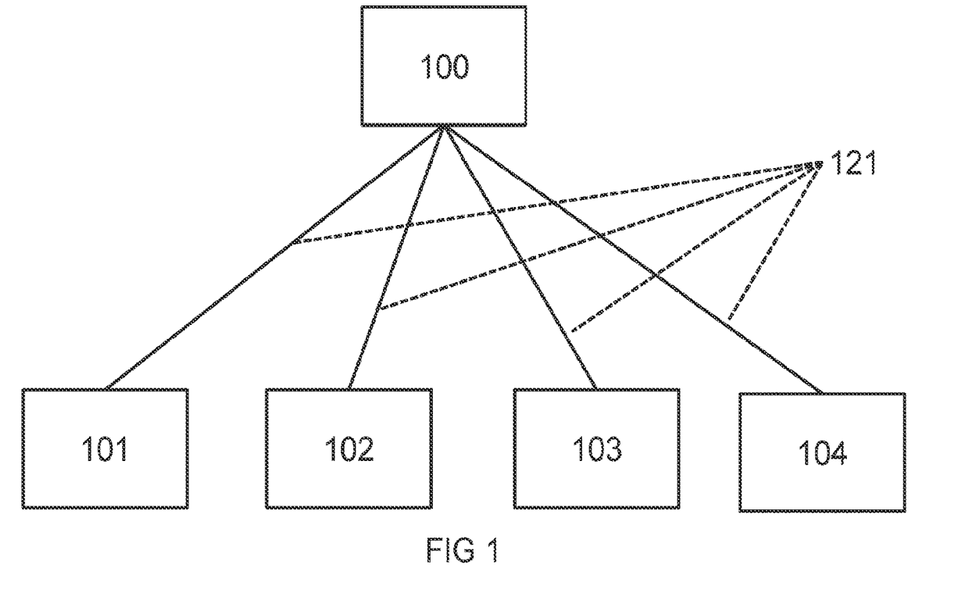
FIG. 1 illustrates a first exemplary BACnet network system incorporating teachings of the present disclosure.

FIG. 1 illustrates a first exemplary BACnet network system incorporating teachings of the present disclosure and having a hub-device 100 with a set of assigned nodes 101-104. In BACnet/SC nodes 101-104 use WebSocket connections 121 in a virtual star topology to the so-called hub-device 100. This is called a "hub-and-spoke" principle and the nodes 101-104 each initiate a respective TLS V1.3-secured WebSocket connection to maintain their "spoke" connection to their assigned hub-device 100, forming one BACnet/SC network. All incoming connections 121 are handled equally by the hub-device 100.

Figure 2:
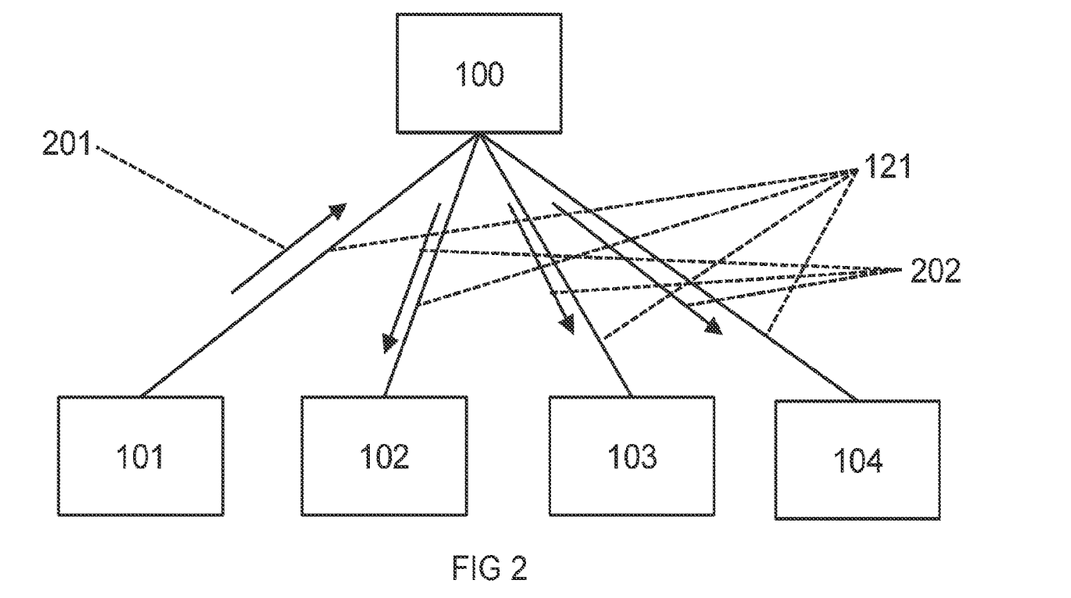
FIG. 2 illustrates a second exemplary BACnet network system incorporating teachings of the present disclosure.

FIG. 2 illustrates a second exemplary BACnet network system incorporating teachings of the present disclosure based on the system according to FIG. 1. All incoming connections 121 are handled equally by the hub-device 100. As WebSockets are a connection-oriented method (based on TCP), this approach avoids lower-level UDP broadcast storms: If a node 101 needs to discover a counterpart for its communication, it sends the broadcast query 201 through the respective spoke to its hub-device (hub) 100. The hub 100 than distributes the query to all other nodes equally 102-104, and those nodes applicable for the query reply to the requesting device via their spoke to the hub 100, to be forwarded to the spoke of the requesting node. Similarly, the hub 100 can forward unicast messages from a node to the destination node based on the destination MAC address of the unicast message.

However, the maximum amount of nodes that may connect to a single hub 100 in such a virtual star topology is limited: On one hand, the central hub element is a "single point of failure", on the other, the hub's resources in handling TLS-secured WebSocket connections and respective traffic is limited. As a consequence, the BACnet standard suggests combining this hub-and-spoke topology as one BACnet network with the well-established routing mechanism of the standard. In that approach, a system is broken down into several BACnet/SC networks with their hubs and with their respective nodes (see FIGS. 1 and 2). Each hub, or primary/failover hub pair, with its assigned nodes form a BACnet/SC network on its own and the BACnet routing mechanism then distributes the traffic back-and forth between those BACnet/SC networks.

It is obvious that hubs 100 are pre-destined to also host such routing function. However, in large systems, it is more likely that a device has a communication demand to another device in a different BACnet network than its own. This results in the aforementioned routing mechanism being used. While routing still applies between, to, and from BACnet/SC networks for compatibility with the existing BACnet world, routing still limits the amount of traffic load between the networks: For discovery, the devices use significant amounts of BACnet broadcast traffic, such as "Who-Is-Router-To-Network X" messages, "Who-Is" and "I-Am" device discovery, and the like, received in all connected nodes. But, large quantities of that traffic is unnecessary in most sections of a system, but a BACnet global broadcast message reaches all BACnet devices in the overall system, while it is useful to typically only one other section of the system actually.

A BACnet client does not know in which of the BACnet networks its destination BACnet device resides, and what its BACnet address (Network Number, "MAC" Address) is. The client has to global broadcast queries into all the BACnet networks—which does not scale well.

Figure 3:
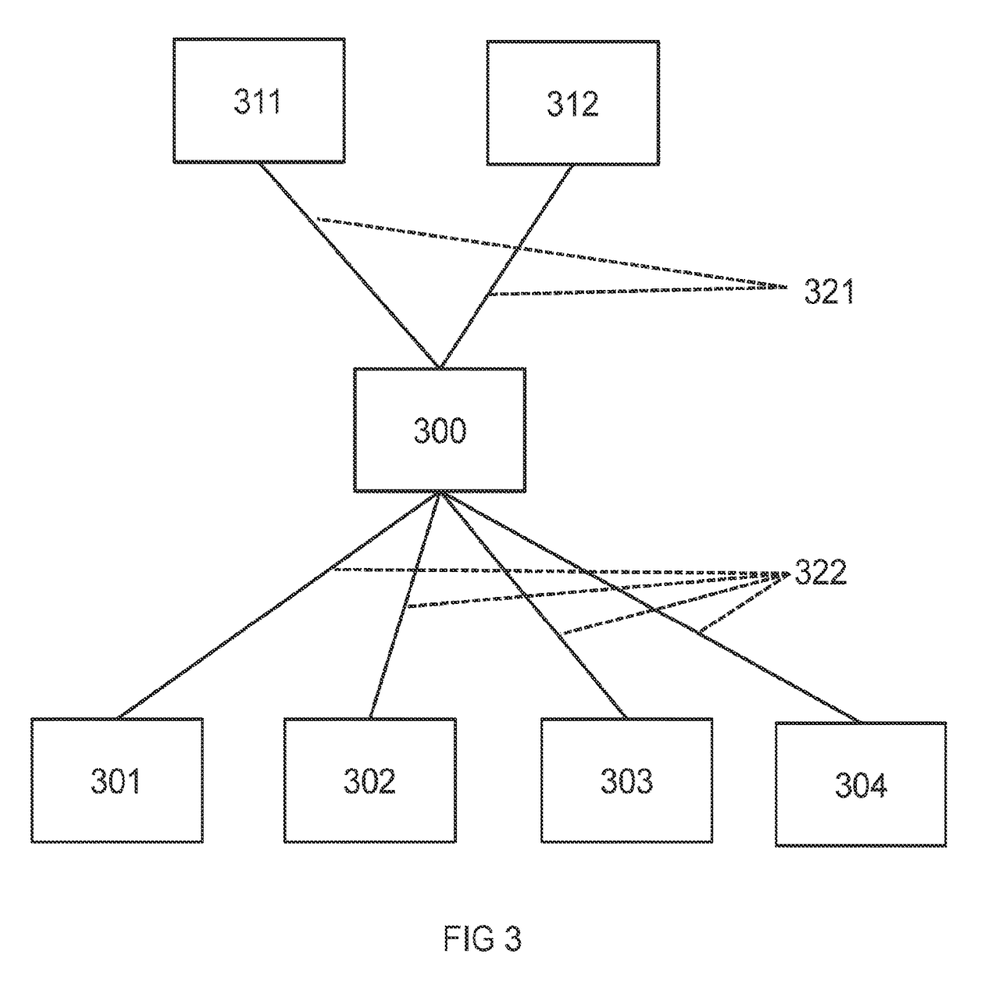
FIG. 3 illustrates a third exemplary BACnet network system incorporating teachings of the present disclosure.

FIG. 3 illustrates a third exemplary BACnet network system incorporating teachings of the present disclosure comprising a directed hub-device 300. The directed hub-device 300 is configured to limit unwanted broadcast traffic. The basic idea consists of using the natural application and communication structure of a building automation system and utilizing this structure for broadcast reduction through a directed behavior of the hub-device 300. That is, a building typically consists of logical "application communication scopes" which have a high intra-scope traffic demand between devices inside the scope, but show a lower and directed inter-scope traffic between devices across the boundary of such scopes.

An application scope may include multiple BACnet networks of any possible BACnet datalink type, including BACnet/SC. In large BACnet/SC systems, such scopes typically use a BACnet router where an outside facing port is connecting as a node (see FIG. 1 or 2: 101, 102, 103, 104) to the hub (see FIG. 1 or 2: 100) of a system level BACnet/SC network. Application scopes also show a pattern in the communication to other scopes that can classify them either being a "supervisory scope", to communicate to all scopes and all devices; or a "directed scope", to communicate to the "supervisory scopes" and its devices only, and not to any other "directed scopes".

Broadcast traffic from a "supervisory scope" needs to reach all other "supervisory scopes" and all "directed scopes".

The teachings of the present disclosure include cutting off the broadcast traffic from a "directed scope" from being distributed to other "directed scopes", preventing these other "directed scopes" from receiving and processing it. In contrast to the standard hub function that would distribute to all connections, and so to all scopes and all devices in the scope regardless.

The teachings herein may substantially cut down on broadcast traffic to be handled by equipment of a "directed scope". The "directed hub" method can be applied on any, or multiple, hierarchical application levels of a BACnet system where the two types of scopes exist, thus, allowing substantially larger BACnet systems to be built with BACnet/SC.

Some embodiments prune off large quantities of unnecessary traffic while keeping all necessary ones untouched, the total broadcast traffic is reduced. This unburdens both the respective hub nodes (means which have to handle the BACnet application level's broadcast messages) as well as the network situation (means which has to handle all the resulting low-level-traffic of the upper layers). Together, this allows to build larger building systems with less resource demand, and also less energy consuming devices.

The directed hub-device 300 is hosting two—instead of one—WebSocket listeners in each hub instance. One is the regular WebSocket listener and accepts uplink-connections 321 for "supervisory scopes" 311, 312. The broadcast distribution among all uplink-connections 321 remains as of the standard. The additional WebSocket listener is used by the directed hub 300 to accept downlink-connections 322 from "directed scopes" 301-304.

The "directed hub" may include a means of configuration to also block unicast messages from one "downlink connection"/"directed scope" to another "downlink connection"/"directed scope". Such a configuration may be used to exclude any traffic between "directed scopes".

Figure 4:
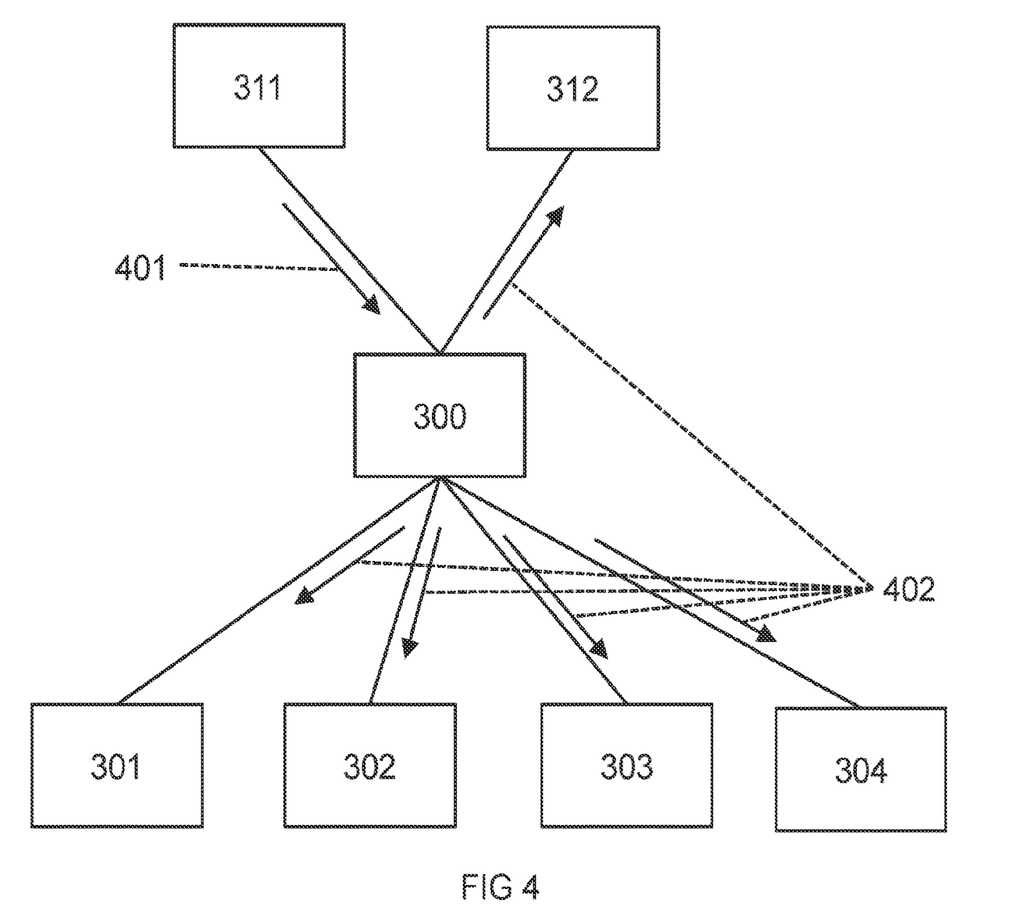
FIG. 4 illustrates a fourth exemplary BACnet network system incorporating teachings of the present disclosure.
Figure 5:
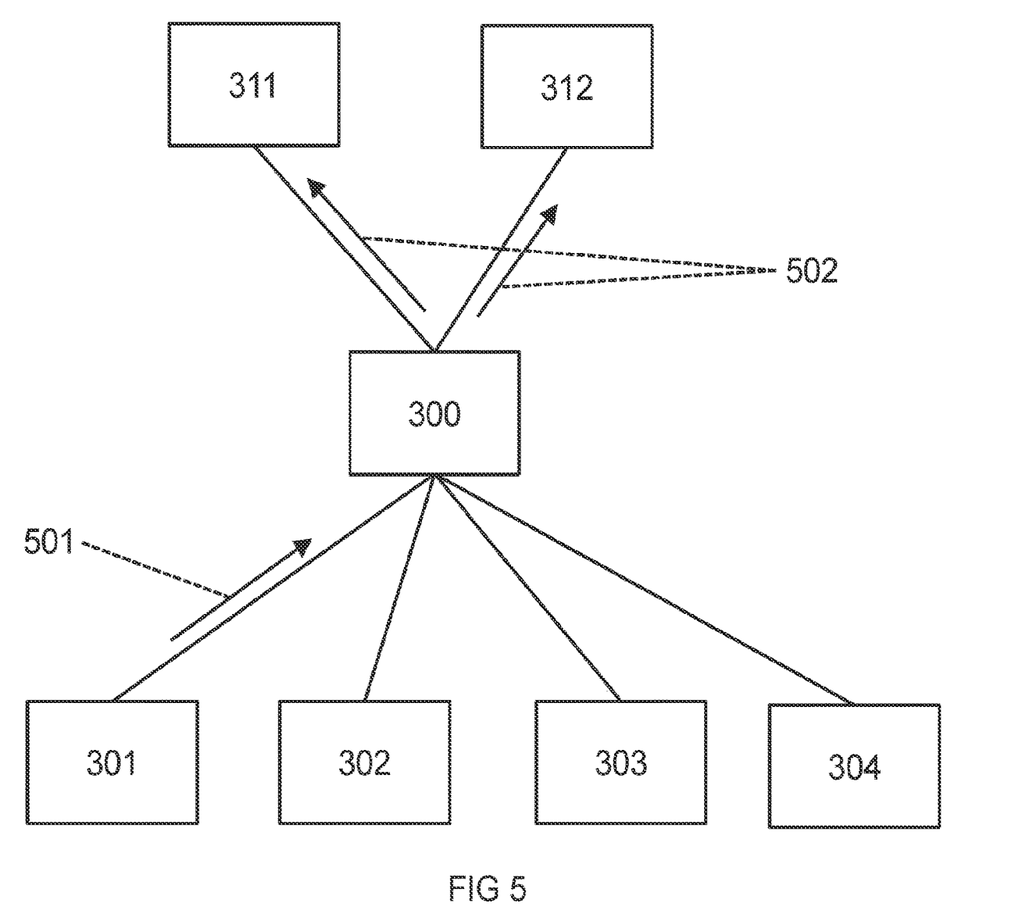
FIG. 5 illustrates a fifth exemplary BACnet network system incorporating teachings of the present disclosure.

The following application communication scopes are typical in a building automation system, and are illustrated as example nodes in FIGS. 3 to 5:

a) The System Scope 311 is the part of the system that wants to view and modify the entire system (e.g.: building management systems), so is clearly a "supervisory scope".

b) The Building Scope 312 is the set of devices that typically realize central and supervisory control functions for an entire building or campus, or do the supervisory control of demand of floors and supply by primary plants. This is also a "supervisory scope".

c) Each Floor Scope 301-303 is a set of devices that realize the room control functions and floor level control, and are thus spatially scattered throughout the floor and its rooms. Floor Scopes includes the respective group communication for e.g., lights and blinds coordination on the floor (a source of Intra-Scope broadcast communication). Floor Scopes are "directed" scopes each.

d) The Plant Scope 304 is a set of devices that realize the central supply and equipment control of primary plants and supply (like boilers, chillers, air-handling-units, etc.). This is a "directed scope", since only controlled from the Building Scope, not from any Floor Scope.

The Building or System Scope router's outside facing port is a node and initiates an "uplink-connection 321 to the directed hub 300, which is to the regular WebSocket listener, now accepting uplink-connections.

A Floor Scope or the Plant Scope router's outside facing port is a node configured to initiate a downlink-connection 322 to the directed hub 300, i.e. to the additional WebSocket listener accepting downlink-connections.

FIG. 4 illustrates a fourth exemplary BACnet network system incorporating teachings of the present disclosure based on the system according to FIG. 3 and comprising the inventive hub-device 300. Broadcasts 401 from the System Scope 311 need to be forwarded 402 to the Building Scope 312, and to all "directed scopes" 301-304.

FIG. 5 illustrates a fifth exemplary BACnet network system incorporating teachings of the present disclosure also based on the system according to FIG. 3 and comprising the inventive hub-device 300. Broadcasts 501 from a Floor Scope 301 need to be forwarded 502 to the Building Scope (312) and the System Scope 311, but do not need to reach neither other Floor Scopes 302, 303, nor the Plant Scope 304.

This approach prunes off traffic in BACnet systems which increases its overall efficiency. For example, by connecting a full set of devices of floor X to such a "downlink websocket" with allowing only uplink broadcasts, it is not just that broadcast traffic from other floors to that very floor X is cut off. It is also that the broadcast traffic from floor X is prevented from flowing over to all sibling floors Y, Z on other downlinks.

Some embodiments include using a second websocket for creating that downlink WebSocket listener, the solution works without any change whatsoever to the standard and is also fully compatible to all regular BACnet/SC nodes of any vendor on the market! The only thing a project engineer has to do is to decide whether his devices are a member of one of the aforementioned "directed scopes" and if so, connect these to the "downlink Websocket" instead of the "uplink Websocket" of the "directed hub"! This is a huge advantage, as this approach thus allows any multi-vendor equipment solution without violating the BACnet standard!

FIGS. 3 to 5 illustrate aspects of a BACnet network system for building automation systems to scale up to large topologies, wherein the BACnet network system comprises a network of BACnet devices 300-304, 311, 312, wherein the network of BACnet devices is organized as a virtual hub-and-spoke network, wherein one of the BACnet devices is implemented as a directed hub-device 300 to which all other BACnet devices are connected as node-devices 301-304, 311, 312 by using WebSocket connections, providing node devices 311 which have a system scope of a building to view and modify the entire building automation system;

providing node devices 312 which have a building scope of a building to realize central functions for the entire building automation system or do the supervisory demand control of floors and supply by primary plants;

wherein the node devices 311 of the system scope and the node-devices 312 of the building scope are assigned to supervisory scope node-devices 311, 312;

providing node-devices 301-303 which have a floor scope of a building to realize room control functions and/or floor level control functions;

providing node-devices 304 which provide a plant scope of a building to realize the central supply and equipment control of primary plants and supply;

wherein the node-devices 301-303 of the floor scope and/or the node-devices 304 of the plant scope are assigned to directed scope node-devices 301-304;

characterized in that the directed hub-device 300 is hosting two WebSocket listeners, wherein the first WebSocket listener is configured to accept uplink-connections 321 for supervisory scope node-devices 311, 312, wherein broadcast distribution of messages from an uplink-connection 321 among all uplink-connections 321 and all downlink-connections 322 is performed according to the BACnet/SC standard;

wherein the second WebSocket listener is configured to accept downlink-connections 322 from directed scope node-devices 301-304;

wherein the directed hub-device 300 is configured to limit the broadcast distribution of broadcast messages from a downlink-connection 322 to each uplink-connection 321, and not to any other downlink-connection 322, wherein the directed hub-device 300 is configured to block or forward unicast messages from one downlink-connection 322 to another downlink-connection 322.

In some embodiments, the BACnet network system is a BACnet/SC (BACnet Secure Connect) based system.

In some embodiments, at least one of the WebSocket connections is a TLS V1.3-secured WebSocket connection.

In some embodiments, the first WebSocket listener is the regular WebSocket listener.

In some embodiments, the node-devices 301-303 which provide the floor scope of a building are configured for respective group communication to coordinate and/or operate actors and/or sensors (e.g. lights and blinds) on the floor.

In some embodiments, the node-devices 304 which provide the plant scope of a building are configured to realize the central supply and equipment control of primary plants and supply (like boilers, chillers, air-handling-units, etc).

In some embodiments, the functionality of the two WebSocket listeners hosted in the directed hub-device 300 is realized by the regular WebSocket listener according the BACnet/SC-standard and wherein the node-devices are configured to realize the broadcast logic and to indicate to the hub whether an uplink-connection or a downlink-connection shall be established with a respective non-standard connection request message.

In some embodiments, the system is configured to perform communication in the BACnet network system.

In some embodiments, instead of making the uplink and downlink connection explicit by two separate WebSocket listeners at the hub (and implementing the respective traffic logic into that hub), it could also be realized in that there is only one (regular) WebSocket listener for BACnet/SC traffic at the "directed hub", but that the nodes themselves realize the logic and indication to the hub whether they should connect uplink or downlink. While this variant would also work, it would require that each node would have to implement the logic. Plus that the hub would also have to implement additional logic to get noticed what type of traffic relation ("uplink" or "downlink") its nodes expect from him. This could be done by so-called "proprietary header options" as the BACnet standard allows, or even more proprietary implementations. But it would be a variant that breaks the interoperability with other vendors' BACnet/SC equipment.

The aforementioned traffic separation and perhaps traffic reduction may also be achieved optionally by pure IT-means (e.g.: application-aware firewalls or other mechanisms to filter traffic on the network layers), but such a solution would require sophisticated synchronization between IT- and OT-staff and additional IT-appliances across the whole lifetime, but this approach seems error-prone, labor-intensive and expensive.

Figure 6:
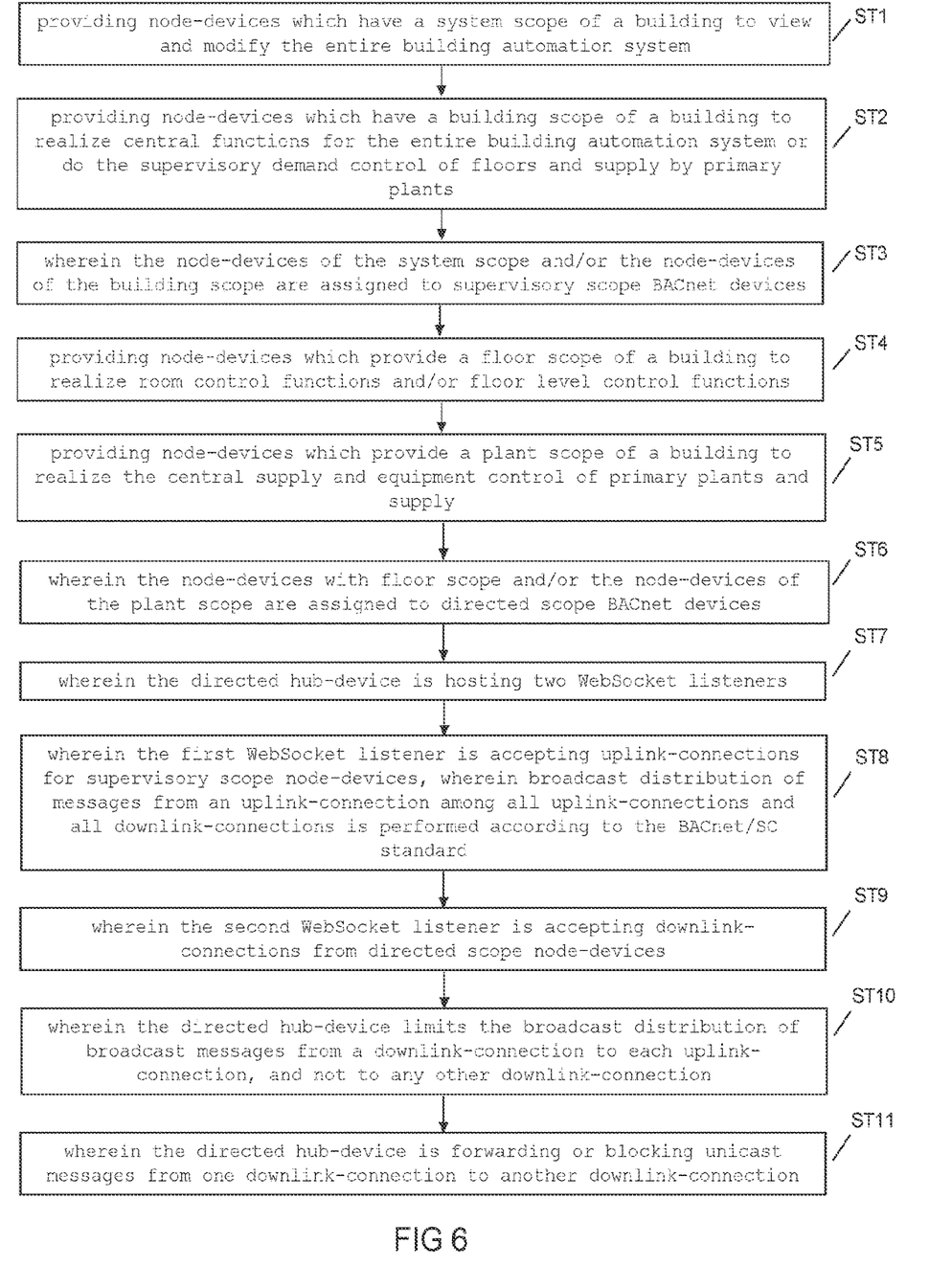
FIG. 6 illustrates a flowchart for an exemplary method to extend BACnet network systems for building automation systems to scale up to large topologies incorporating teachings of the present disclosure.

FIG. 6 illustrates a flowchart for an example method incorporating teachings of the present disclosure to extend BACnet network systems for building automation systems to scale up to large topologies, wherein the BACnet network system comprises a network of BACnet devices (300-304, 311, 312), wherein the network of BACnet devices is organized as a virtual hub-and-spoke network, wherein one of the BACnet devices is implemented as a directed hub-device (300) to which all other BACnet devices are connected as node-devices (301-304, 311, 312) by using WebSocket connections. The example method comprising:
  (ST1) providing node-devices (311) which have a system scope of a building to view and modify the entire building automation system;
  (ST2) providing node-devices (312) which have a building scope of a building to realize central functions for the entire building automation system or do the supervisory demand control of floors and supply by primary plants;
  (ST3) wherein the node-devices (311) of the system scope and/or the node-devices (312) of the building scope are assigned to supervisory scope BACnet devices (311, 312);
  (ST4) providing node-devices (301-303) which provide a floor scope of a building to realize room control functions and/or floor level control functions;
  (ST5) providing node-devices (304) which provide a plant scope of a building to realize the central supply and equipment control of primary plants and supply;
  (ST6) wherein the node-devices (301-303) with floor scope and/or the node-devices (304) of the plant scope are assigned to directed scope BACnet devices (301-304);
  (ST7) wherein the directed hub-device (300) is hosting two WebSocket listeners,
  (ST8) wherein the first WebSocket listener is accepting uplink-connections (321) for supervisory scope node-devices (311, 312), wherein broadcast distribution of messages from an uplink-connection (321) among all uplink-connections (321) and all downlink-connections (322) is performed according to the BACnet/SC standard;
  (ST9) wherein the second WebSocket listener is accepting downlink-connections (322) from directed scope node-devices (301 304);
  (ST10) wherein the directed hub-device limits the broadcast distribution of broadcast messages from a downlink-connection (322) to each uplink-connection (321), and not to any other downlink-connection (322),
  (ST11) wherein the directed hub-device (300) is forwarding or blocking unicast messages from one downlink-connection (322) to another downlink-connection (322).

In some embodiments, the BACnet network system is a BACnet/SC (BACnet Secure Connect) based system. In some embodiments, at least one of the WebSocket connections is a TLS V1.3-secured WebSocket connection. In some embodiments, the first WebSocket listener is the regular WebSocket listener.

In some embodiments, the node-devices (301-303) which have a floor scope of a building are configured for respective group communication to coordinate and/or operate actors and/or sensors (e.g. lights and blinds) on the floor.

In some embodiments, the node-devices (304) which have the plant scope of a building are configured to realize the central supply and equipment control of primary plants and supply (like boilers, chillers, air-handling-units, etc.

In some embodiments, the functionality of the two WebSocket listeners hosted in the directed hub-device (300) is realized by the regular WebSocket listener according the BACnet/SC-standard and wherein the node-devices (301-304, 311, 321) are configured to realize the broadcast scope and to indicate to the hub whether an uplink-connection or a downlink-connection rule shall be performed to a respective message.

Figure 7:
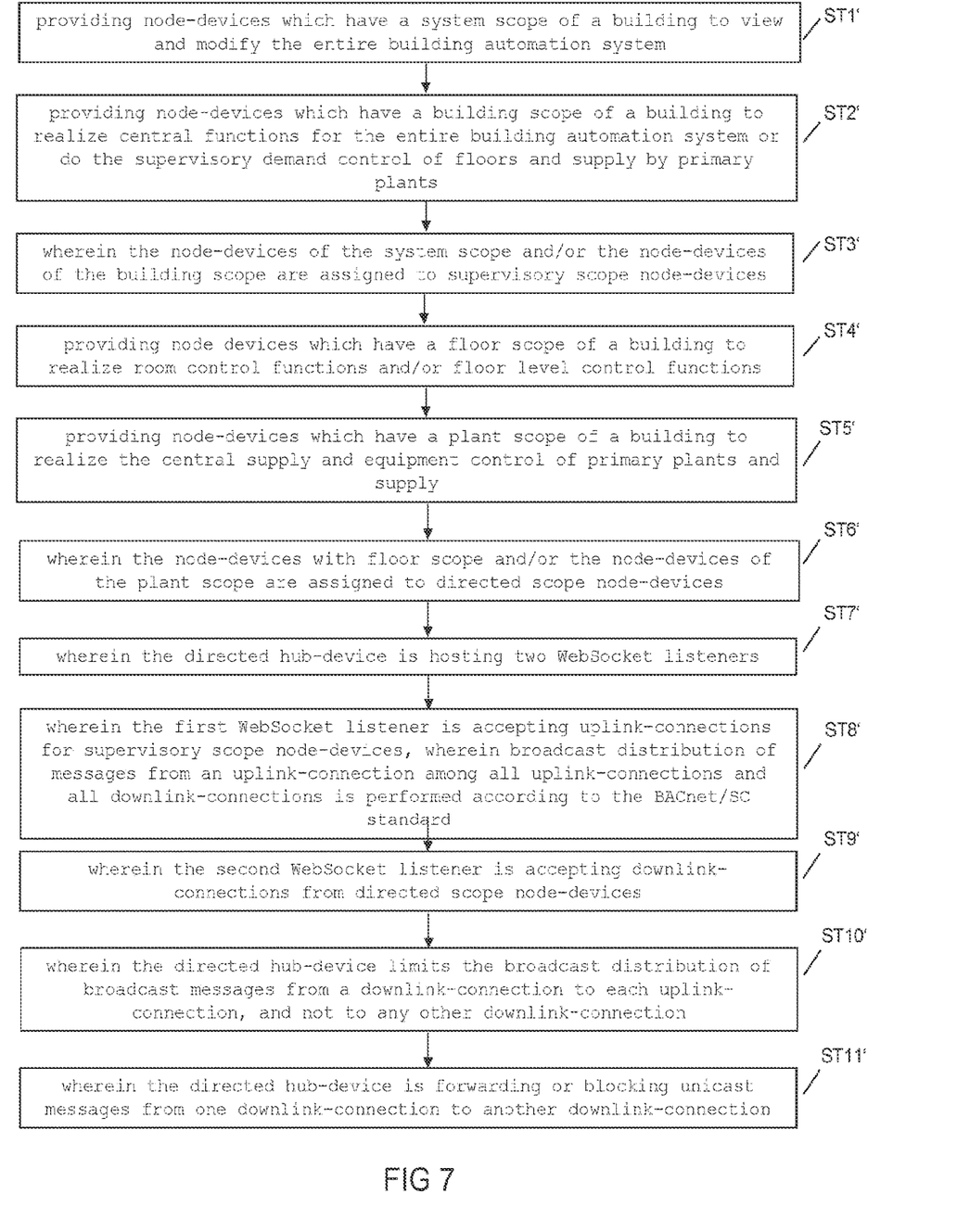
FIG. 7 illustrates a flowchart for an exemplary method to perform communication in BACnet network systems for building automation systems incorporating teachings of the present disclosure.

FIG. 7 illustrates a flowchart for an example method incorporating teachings of the present disclosure to perform communication in BACnet network systems for building automation systems, wherein the BACnet network system comprises a network of BACnet devices (300-304, 311, 312), wherein the network of BACnet devices is organized as a virtual hub- and spoke-network, wherein one of the BACnet devices is implemented as a directed hub-device (300) to which all other BACnet devices are connected as node-devices (301-304, 311, 312) by using WebSocket connections. The method comprises the following steps:
  (ST1') providing node-devices (311) which have a system scope of a building to view and modify the entire building automation system;
  (ST2') providing node-devices (312) which have a building scope of a building to realize central functions for the entire building automation system or do the supervisory demand control of floors and supply by primary plants;
  (ST3') wherein the node-devices (311) of the system scope and/or the node-devices (312) of the building scope are assigned to supervisory scope node-devices (311, 312);
  (ST4') providing node devices (301-303) which have a floor scope of a building to realize room control functions and/or floor level control functions;
  (ST5') providing node-devices (304) which have a plant scope of a building to realize the central supply and equipment control of primary plants and supply;

(ST6') wherein the node-devices (301-303) with floor scope and/or the node-devices (304) of the plant scope are assigned to directed scope node-devices (301-304);

(ST7') wherein the directed hub-device (300) is hosting two WebSocket listeners, (ST8') wherein the first WebSocket listener is accepting uplink-connections (321) for supervisory scope node-devices (311, 312), wherein broadcast distribution of messages from an uplink-connection (321) among all uplink-connections (321) and all downlink-connections (322) is performed according to the BACnet/SC standard;

(ST9') wherein the second WebSocket listener is accepting downlink-connections (322) from directed scope node-devices (301-304);

(ST10') wherein the directed hub-device (300) limits the broadcast distribution of broadcast messages from a downlink-connection (322) to each uplink-connection (321), and not to any other downlink-connection (322);

(ST11') wherein the directed hub-device (300) is forwarding or blocking unicast messages from one downlink-connection (322) to another downlink-connection (322).

In some embodiments, the BACnet network system is a BACnet/SC (BACnet Secure Connect) based system.

In some embodiments, at least one of the WebSocket connections is a TLS V1.3-secured WebSocket connection.

In some embodiments, the first WebSocket listener is the regular WebSocket listener.

In some embodiments, the node-devices (301-303) which have a floor scope of a building are configured for respective group (e.g. lights and blinds) on the floor.

In some embodiments, the node-devices (304) which have the plant scope of a building are configured to realize the central supply and equipment control of primary plants and supply (like boilers, chillers, air-handling-units, etc.

In some embodiments, the functionality of the two WebSocket listeners hosted in the directed hub-device (300) is realized by the regular WebSocket listener according the BACnet/SC-standard and wherein the node-devices (301-304, 311, 321) are configured to realize the broadcast scope and to indicate to the hub whether an uplink-connection or a downlink-connection rule shall be performed to a respective message.

The methods depicted in FIG. 6 or 7 can be realized in Building Automation Systems comprising adequate servers, controllers, and field devices, having adequate processors, software, memories, input/output and communication means.

REFERENCE SIGNS

100 Hub-device
121 WebSocket connection
101-104 node
201 Broadcast Query
202 Forwarded Broadcast Query
300 Directed Hub-device
311 System Scope
312 Building Scope
301-303 Floor Scope
304 Plant Scope
321 Uplink Connection
322 Downlink Connection
401, 501 Broadcast Query
402, 502 Forwarded Broadcast Query
ST1-ST11, ST1'-ST11' Step

What is claimed is:

1. A method to extend BACnet network systems for building automation systems to scale up to large topologies, wherein the BACnet network system comprises a network of BACnet devices organized as a virtual hub-and-spoke network, wherein one of the BACnet devices includes a directed hub-device to which all other BACnet devices are connected as node-devices using WebSocket connections, the method comprising:
   providing node-devices with a system scope of a building to view and modify the entire building automation system;
   providing node-devices with a building scope of a building to realize central functions for the entire building automation system or do the supervisory demand control of floors and supply by primary plants;
   assigning the node-devices of the system scope and/or the node-devices of the building scope to supervisory scope BACnet devices;
   providing node-devices with a floor scope of a building to realize room control functions and/or floor level control functions;
   providing node-devices with a plant scope of a building to realize the central supply and equipment control of primary plants and supply;
   assigning the node-devices with floor scope and/or the node-devices of the plant scope to directed scope BACnet devices;
   wherein the directed hub-device hosts two WebSocket listeners;
   using the first WebSocket listener to accept uplink-connections for supervisory scope node-devices;
   using the BACnet Secure Connect standard for broadcast distribution of messages from an uplink-connection among all uplink-connections and all downlink-connections;
   using the second WebSocket listener to accept downlink-connections from directed scope node-devices;
   using the directed hub-device to limit the broadcast distribution of broadcast messages from a downlink-connection to each uplink-connection, and not to any other downlink-connection; and
   using the directed hub-device to forward or block unicast messages from one downlink-connection to another downlink-connection.

2. The method according claim 1, wherein the BACnet network system comprises a BACnet/SC (BACnet Secure Connect) based system.

3. The method according to claim 1, wherein at least one of the WebSocket connections comprises a TLS V1.3-secured WebSocket connection.

4. The method according to claim 1, wherein the first WebSocket listener comprises the regular WebSocket listener.

5. The method according to claim 1, wherein the node-devices with a floor scope of a building are configured for respective group communication to coordinate and/or operate actors and/or sensors on the floor.

6. The method according to claim 1, wherein the node-devices with the plant scope of a building are configured to realize the central supply and equipment control of primary plants and supply.

7. The method according to claim 1, wherein:
   the functionality of the two WebSocket listeners hosted in the directed hub-device is realized by the regular WebSocket listener according to the BACnet/SC-standard; and the node-devices are configured to realize the broadcast scope and to indicate to the hub whether an uplink-connection or a downlink-connection rule shall be performed to a respective message.

8. A BACnet network system for building automation systems to scale up to large topologies, the BACnet network system comprising:
a network of BACnet devices organized as a virtual hub-and-spoke network;
wherein one of the BACnet devices comprises a directed hub-device to which all other BACnet devices are connected as node-devices using WebSocket connections,
node devices with a system scope of a building to view and modify the entire building automation system;
node devices with a building scope of a building to realize central functions for the entire building automation system or do the supervisory demand control of floors and supply by primary plants;
wherein the node devices of the system scope and the node-devices of the building scope are assigned to supervisory scope node-devices;
node-devices with a floor scope of a building to realize room control functions and/or floor level control functions;
node-devices with a plant scope of a building to realize the central supply and equipment control of primary plants and supply;
wherein the node-devices of the floor scope and/or the node-devices of the plant scope are assigned to directed scope node-devices;
wherein the directed hub-device hosts two WebSocket listeners;
wherein the first WebSocket listener is configured to accept uplink-connections for supervisory scope node-devices;
wherein broadcast distribution of messages from an uplink-connection among all uplink-connections and all downlink-connections is performed according to the BACnet Secure Connect standard;
wherein the second WebSocket listener is configured to accept downlink-connections from directed scope node-devices;
wherein the directed hub-device is configured to limit the broadcast distribution of broadcast messages from a downlink-connection to each uplink-connection and not to any other downlink-connection; and
wherein the directed hub-device is configured to block or forward unicast messages from one downlink-connection to another downlink-connection.

9. The system according claim 8, wherein the BACnet network system is a BACnet Secure Connect based system.

10. The system according to claim 8, wherein at least one of the WebSocket connections comprises a TLS V1.3-secured WebSocket connection.

11. The system according to claim 8, wherein the first WebSocket listener comprises the regular WebSocket listener.

12. The system according to claim 8, wherein the node-devices with the floor scope of a building are configured for respective group communication to coordinate and/or operate actors and/or sensors on the floor.

13. The system according to claim 8, wherein the node-devices with the plant scope of a building are configured to realize the central supply and equipment control of primary plants and supply.

14. The system according to claim 8, wherein:
the functionality of the two WebSocket listeners hosted in the directed hub-device is realized by the regular WebSocket listener according the BACnet Secure Connect standard; and
the node-devices are configured to realize the broadcast logic and to indicate to the hub whether an uplink-connection or a downlink-connection shall be established with a respective non-standard connection request message.

15. The system according to claim 8, wherein the system is configured to perform communication in the BACnet network system.

16. A method to perform communication in BACnet network systems for building automation systems, wherein the BACnet network system comprises a network of BACnet devices organized as a virtual hub- and spoke-network, wherein one of the BACnet devices comprises a directed hub-device to which all other BACnet devices are connected as node-devices using WebSocket connections, the method comprising:
providing node-devices with a system scope of a building to view and modify the entire building automation system;
providing node-devices with a building scope of a building to realize central functions for the entire building automation system or do the supervisory demand control of floors and supply by primary plants;
assigning the node-devices of the system scope and/or the node-devices of the building scope to supervisory scope node-devices;
providing node devices with a floor scope of a building to realize room control functions and/or floor level control functions;
providing node-devices with a plant scope of a building to realize the central supply and equipment control of primary plants and supply;
assigning the node-devices with floor scope and/or the node-devices of the plant scope to directed scope node-devices;
wherein the directed hub-device hosts two WebSocket listeners;
using the first WebSocket listener to accept uplink-connections for supervisory scope node-devices;
using the BACnet Secure Connect standard to broadcast distribution of messages from an uplink-connection among all uplink-connections and all downlink-connections;
using the second WebSocket listener to accept downlink-connections from directed scope node-devices;
using the directed hub-device to limit the broadcast distribution of broadcast messages from a downlink-connection to each uplink-connection, and not to any other downlink-connection; and
using the directed hub-device to forward or block unicast messages from one downlink-connection to another downlink-connection.

17. The method according claim 16, wherein the BACnet network system is a BACnet Secure Connect based system.

18. The method according to claim 16, wherein at least one of the WebSocket connections comprises a TLS V1.3-secured WebSocket connection.

19. The method according to claim 16, wherein the first WebSocket listener comprises the regular WebSocket listener.

20. The method according to claim 16, wherein the node-devices with a floor scope of a building are configured for respective group communication to coordinate and/or operate actors and/or sensors on the floor.

21. The method according to claim 16, wherein the node-devices with the plant scope of a building are configured to realize the central supply and equipment control of primary plants and supply.

22. The method according to claim 16, wherein:
the functionality of the two WebSocket listeners hosted in the directed hub-device is realized by the regular WebSocket listener according the BACnet Secure Connect standard; and
the node-devices are configured to realize the broadcast scope and to indicate to the hub whether an uplink-connection or a downlink-connection rule shall be performed to a respective message.

* * * * *